United States Patent Office  3,211,565
Patented Oct. 12, 1965

3,211,565
HYDROPHOBIC ORGANOPHILIC PARTICULATE MATTER
Wayne M. Bundy, Westfield, N.J., assignor to Georgia Kaolin Company, a corporation of New Jersey
No Drawing. Filed Nov. 15, 1961, Ser. No. 152,671
5 Claims. (Cl. 106—308)

This invention relates to organophilic hydrophobic particulate materials and particularly to pigments and extenders for use in organic vehicles which may be used in organic non-polar media as well as in intermediate polar materials containing acid groups and the like.

The efficient incorporation of particulate materials such as pigments and extenders in organic vehicles presents many difficulties. The wetting, dispersion and the general physical and chemical character of the resulting filler-vehicle product are of prime importance in the pigmentation and extension of organic systems. It has long been known that pigments which are normally hydrophobic may be treated so as to make it possible to incorporate them into a specific system. Unfortunately, treatment of such particulate materials for incorporation into one system would not necessarily permit them to be incorporated into any other organic system. For example, surface treatment of particulate material with aliphatic amines and acids has been extensively investigated for the purpose of producing hydrophobic particles. The degree of hydrophobicity of such coatings is a function of the chain lengths, increasing with the number of carbon atoms. The treatment on a particular surface is generally brought about by insolubilization with acids, soap formation with polyvalent metals and by clay-salt formations as with amines. Such materials are generally efficient for dispersion in non-polar organic media. The compatibility of such particulate materials with more polar organic materials, such as polyester and alkyd resins, is susbtantially decreased by the treatment. The compatibility of these treated materials can be improved in polar systems by decreasing the level of treatment. However, this decrease in treatment level carries with it a concommitant loss of hydrophobicity. Examples of some of the prior art treatments may be found in the patent literature.

Patent 2,455,898 describes a coated toner with alkyd metal salts of fatty acids and insolubilization of fatty acids with polyvalent metal to produce a pigment for dispersion in intaglio and rotogravure printing inks. A similar practice is described in Patents 2,323,748 and 2,323,749 for production of a water repellent ultramarine for bluing of anthracite coal.

Patent 2,068,066 describes a treatment of inorganic pigments with fatty acids for dispersion in paint and rubber.

Patent 2,697,699 describes a surface treatment of clay with unsaturated fatty amines for dispersion in rubber for the purpose of reinforcement. The practice of these several patents is specific to the particular area described in the patent. The materials are not universal for intermediate polarity or non-polar organic systems.

The process of the present invention is designed to overcome the limitations which are inherent in these prior art practices and to provide a hydrophobic organophilic particulate material which is capable of universal application in organic non-polar media as well as intermediate polar materials.

In the practice of my invention, I form an aqueous suspension of the particles to be treated. The aqueous suspension is then treated with an organic diamine followed by a treatment with oleic acid. After the fatty acid is thoroughly mixed, the pH of the slurry is adjusted with aluminum sulfate to a pH between about 3 and 5. As soon as the pH is stabilized, the slurry is then adjusted to a pH between about 6.5 and 7.5 with ammonium hydroxide. The pigment is then separated from the aqueous phase and dried at a temperature between about 90 and 120° C. My preferred practice is to treat the slurry of particulate material with ethylene diamine, followed by treatment with oleic acid, adjustment to pH with aluminum sulfate and finally to pH 7 with ammonium hydroxide followed by washing and drying at about 100° C. The practice of this invention will perhaps be more clearly understood by reference to the following example:

A kaolinite slurry is formed by mechanically dispersing kaolinite having a mean particle size of 0.5 micron mechanically in water at 25% solids. Ethylene diamine is added to the slurry in an amount equivalent to 0.6% on the weight of the clay and mixed for approximately thirty minutes to separate small fractions of this slurry. Varying amounts of oleic acids are added in the following amounts: 2.4%, 2.0% and 1.6%. These three fractions are adjusted to pH 7 with a dilute solution of aluminum sulfate, dried at 100° C. and pulverized. The materials are suspended in mineral oil and styrenated polyester and the viscosity determined as follows:

*Table I*

| Percent Oleic Acid | Brookfield Viscosity in cp. (10 r.p.m.) ||
|---|---|---|
| | Mineral Oil | Styrenated Polyester |
| 2.4 | 1,400 | 17,000 |
| 2.0 | 1,200 | 13,000 |
| 1.6 | 4,000 | 12,000 |

It will be seen from this data that 2% is the optimum level of oleic acid in both systems. Having determined the optimum level of oleic acid, the amount is decreased by 25% to 1.5% oleic acid to be used on the system. To the main body of the slurry is then added this optimum amount of 1.5% of oleic acid. The pH of the system is adjusted to 4 with aluminum sulfate and mixed until the pH is stabilized. The system is then adjusted to pH 7 with dilute ammonium hydroxide and then again mixed. The slurry is then washed and dried at 100° C. The properties of the treated kaolinite is set out in Table I.

The same practice outlined in the foregoing example was followed with clay slurries of different mean particle size. The results are set out in Table II.

Preferably, the treatment with organic diamine is at a level of about 0.25% to 1% based on the dry weight of the particulate material.

Table II

| Mean Particle Size in Microns | Percent Oleic Acid | Percent Moisture Adsorption | | Brookfield Viscosity in cp. (10 r.p.m.) | | | |
|---|---|---|---|---|---|---|---|
| | | | | Mineral Oil | | Styrenated Polyester | |
| | | Treated | Untreated | Treated | Untreated | Treated | Untreated |
| 0.5 | 1.50 | .236 | .690 | 400 | 10,000 | 5,000 | >100,000 |

Table III

| Mean Particle Size in Microns | Percent Oleic Acid | Percent Moisture Adsorption | | Brookfield Viscosity in cp. (10 r.p.m.) | | | |
|---|---|---|---|---|---|---|---|
| | | | | Mineral Oil | | Styrenated Polyester | |
| | | Treated | Untreated | Treated | Untreated | Treated | Untreated |
| 0.2 | 2.10 | .330 | .809 | 1,200 | 36,000 | 5,200 | >100,000 |
| 0.7 | 1.20 | .173 | .620 | 400 | 3,000 | 4,400 | 20,000 |
| 4.5 | 0.90 | .162 | .465 | 400 | 2,400 | 5,000 | 14,000 |
| 9.0 | 0.85 | .146 | .387 | 200 | 1,200 | 6,000 | 10,000 |
| 1.2 | 1.20 | .086 | .170 | 200 | 32,000 | 16,000 | >100,000 |

The resulting kaolinite particles may be incorporated into non-polar organic systems such as hydrocarbon resins or into more polar organic material such as polyester and alkyd resins. Prior art materials did not have this flexibility.

Other particulate materials may be similarly treated for a broader spectrum application.

The practice of this invention applied to kaolinite particles will provide kaolinite particles having on the surfaces thereof aluminum salt of oleic acid bonded thereto by ethylene diamine.

I shall use the term "optimum level of viscosity" in this application to mean the lowest level of viscosity in mineral oil produced by treating a particulate material with any given amount of ethylene diamine between 0.25% and 1% and various amounts of fatty acid being used and drying at 100° C.

I find that by determining the optimum level of viscosity in mineral oil of treated material I can obtain a fatty acid value usuable for purposes of this invention. By reducing this level 25%, I obtain the desired amount of fatty acid in the system.

While I have illustrated and described certain presently preferred practices in my invention, it will be understood that this invention may be otherwise embodied within the scope of the following claims.

I claim:

1. The method of treating hydrophilic particulate material to provide a hydrophobic organophilic particulate material comprising the steps of forming an aqueous slurry of said particulate material, adding to said slurry about 0.25% to 1% of ethylene diamine, adding to the diamine treated material about 75% of the amount of an oleic acid which will produce the "optimum level of viscosity" in mineral oil, adjusting the pH to about pH 3 to pH 5 with aluminum sulfate, readjusting to about pH 6.5 to pH 7.5 with ammonium hydroxide, separating the particulate material from the aqueous phase and drying said materials between about 90° to 120° C.

2. The method of treating kaolinite particles to convert said particles to a hydrophobic organophilic state comprising the steps of forming an aqueous slurry of said kaolinite particles, adding to said slurry about 0.25% to 1% of ethylene diamine, adding to the diamine treated material about 75% of the amount of an oleic acid which will produce the "optimum level of viscosity" in mineral oil, adjusting the pH to about pH 3 to pH 5 with aluminum sulfate, readjusting to about pH 6.5 to pH 7.5 with ammonium hydroxide, separating the particulate material from the aqueous phase and drying said materials between about 90° to 120° C.

3. The method of treating hydrophilic particulate material to provide a hydrophobic organophilic particulate material comprising the steps of forming an aqueous slurry of said particulate material, adding to said slurry about 0.6% of ethylene diamine, adding to the diamine treated material about 75% of the amount of oleic acid which will produce the "optimum level of viscosity" in mineral oil adjusting the pH to about pH 4 with aluminum sulfate, readjusting pH 7 with ammonium hydroxide, separating the particulate material from the aqueous phase and drying said materials at about 100° C.

4. The method of treating kaoliniate particles to provide a hydrophobic organophilic kaolinite comprising the steps of forming an aqueous slurry of said kaolinite, adding to said slurry about 0.6% of ethylene diamine, adding to the diamine treated material about 75% of the amount of oleic acid which will produce the "optimum level of viscosity" in mineral oil, adjusting the pH to about pH 4 with aluminum sulfate, readjusting to about pH 7.5 with ammonium hydroxide, separating the particulate material from the aqueous phase and drying said materials at about 100° C.

5. Kaolinite particles having on the surface thereof aluminum salt of oleic acid bonded thereto by ethylene diamine prepared by the steps of forming an aqueous slurry of said kaolinite particles, adding to said slurry about 0.25% to 1% of ethylene diamine, adding to the diamine treated material about 75% of the amount of an oleic acid which will produce the "optimum level of viscosity" of said ethylene diamine treated clay in mineral oil, adjusting the pH of the resulting slurry from about pH 3 to pH 5 with aluminum sulfate, thereafter readjusting the slurry to about pH 6.5 to pH 7.5% with ammonium hydroxide and separating the particulate treated material from the aqueous phase and drying said materials between about 90° to 120° C.

References Cited by the Examiner

UNITED STATES PATENTS 2,852,406  9/58  Riegler et al. _____ 106—308
2,982,665  5/61  Wilcox _____ 106—308

TOBIAS E. LEVOW, Primary Examiner.

JOHN R. SPECK, Examiner.

UNITED STATES PATENT OFFICE
CERTIFICATE OF CORRECTION

Patent No. 3,211,565                    October 12, 1965

Wayne M. Bundy

It is hereby certified that error appears in the above numbered patent requiring correction and that the said Letters Patent should read as corrected below.

Column 2, line 15, for "pH" read -- pH 4 --; column 4, line 39, for "kaoliniate" read -- kaolinite --.

Signed and sealed this 28th day of June 1966.

(SEAL)
Attest:

ERNEST W. SWIDER                  EDWARD J. BRENNER
Attesting Officer                    Commissioner of Patents